United States Patent [19]
Ulich et al.

[11] Patent Number: 5,120,128
[45] Date of Patent: Jun. 9, 1992

[54] APPARATUS FOR SENSING WAVEFRONT ABERRATION

[75] Inventors: Bobby L. Ulich; Anthony D. Gleckler, both of Tucson, Ariz.

[73] Assignee: Kaman Aerospace Corporation, Bloomfield, Conn.

[21] Appl. No.: 641,444

[22] Filed: Jan. 14, 1991

[51] Int. Cl.$^5$ ............................................... G01J 1/20
[52] U.S. Cl. ................................... 356/121; 250/201.9
[58] Field of Search ...................... 356/121; 250/201.9

[56] References Cited
U.S. PATENT DOCUMENTS 4,725,138  2/1988  Wirth et al. ......................... 356/121

*Primary Examiner*—Richard A. Rosenberger
*Attorney, Agent, or Firm*—Fishman, Dionne & Cantor

[57] ABSTRACT

A wavefront aberration sensor includes a beam splitter, one or more aberration sensor modules and a photodetector for sensing total light power. The aberration sensor modules each provide two voltage outputs from a pair of photodetectors. Differences in the voltage pairs are normalized by the total light power to represent signed aberration amplitudes of phase aberrations present in an input optical beam. The aberration amplitudes may be combined in a digital computer to provide a reconstructed wavefront.

14 Claims, 4 Drawing Sheets

APPARATUS FOR SENSING WAVEFRONT ABERRATION

TECHNICAL FIELD

The present invention is related to adaptive optics systems and more particularly relates to sensors for sensing wavefront distortions in an optical beam.

BACKGROUND OF THE INVENTION

It is known that a light beam can be significantly distorted as it passes through the atmosphere or an optical system. Distortion of light beams limits the resolution of images received by an optical system for viewing an object. The optical system itself may introduce additional distortions which further reduce the resolution of the image.

Adaptive optical systems for overcoming the above discussed distortions by adding compensators to the optical path when viewing an object are known, e.g. systems described in U.S. Pat. Nos. 4,825,062 and 4,865,454, and 4,950,878.

The systems described in the above cited patents suffer from several drawbacks, i.e.

1) the image must be of an unresolved point source, or 2) the image must be of a relatively simple extended object within a field of view with a uniform background, or 3) the image brightness must be constant during phase sensing operation.

Each of the above referenced sensors require that simple objects be viewed against an uncluttered background, i.e. the sensors will not work with an arbitrary image scene. In particular, none of the above sensors will work with images of scenes which fill the entire sensor field of view, such as a view of the earth from an airplane or satellite.

SUMMARY OF THE INVENTION

An apparatus for sensing phase aberration in an optical beam is disclosed. The apparatus includes beamsplitter means for splitting the optical beam into identical first and second replica beams and aberration sensor means for detecting a selected phase aberration of the first replica beam. The aberration sensor provides first and second aberration sensor output signals. Photodetector means for sensing total light power of the second replica beam are also provided. The photodetector means provides a signal indicative of the total light power of the second replica beam. Signal processing means are provided for calculating an aberration coefficient indicative of the signal aberration amplitude of the selected aberration from the difference between the first and second aberration sensor output signals normalized by the photodetector output signal.

The apparatus of the present invention functions with an arbitrary input scene, which is not required to have a well defined centroid, provided some high spatial frequencies are present in the light beam.

The aberration coefficients provided by the apparatus of the present invention are insensitive to fluctuations in the brightness of the optical beam and are provided with a very large temporal bandwidth. Thus this invention will work with either coherent wavelength, amplitude-modulated or pulsed illumination. A means for converting incoherent radiation to coherent radiation and providing coherent input to the above disclosed apparatus, thereby allowing the apparatus to function with incoherent illumination is also disclosed.

DETAILED DESCRIPTION OF THE INVENTION

Figure 1:
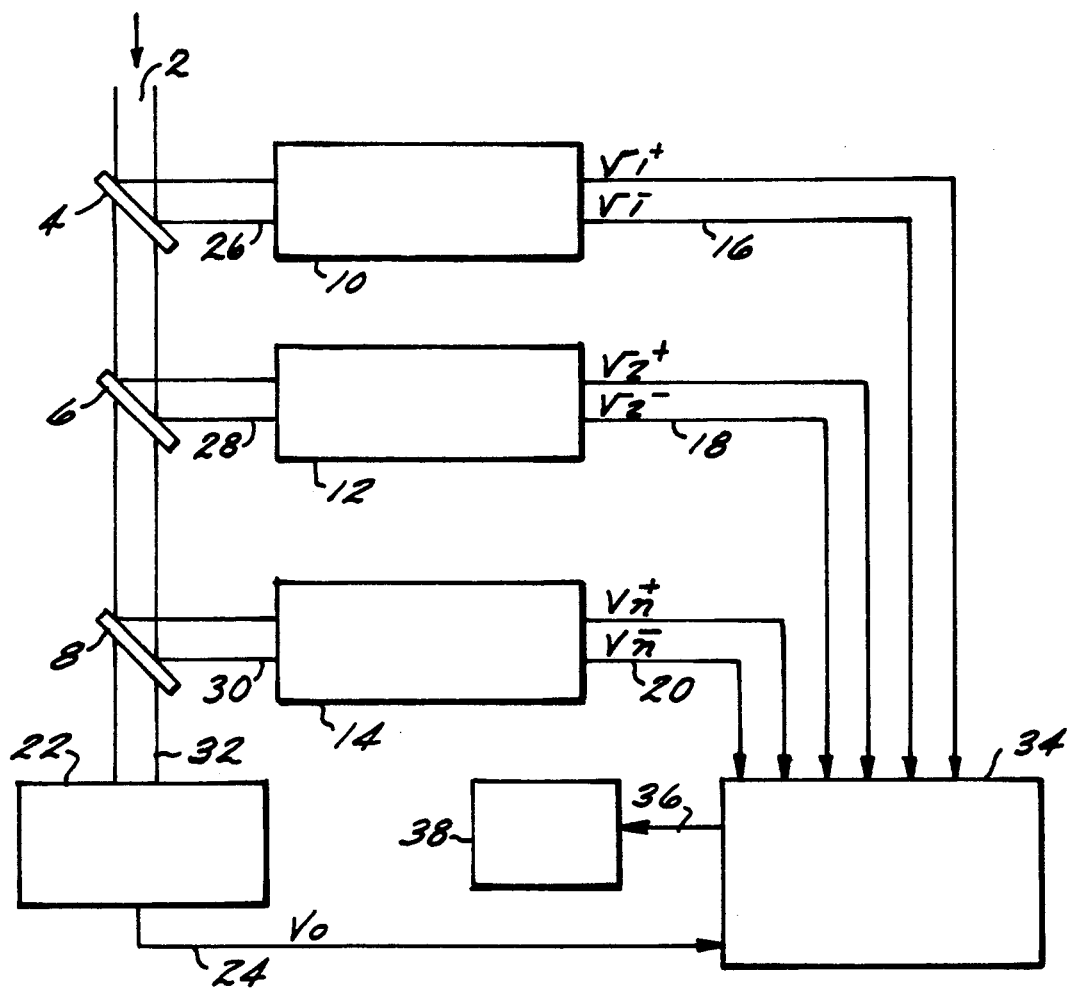
FIG. 1 shows a schematic view of an aberration sensor of the present invention.

A wavefront aberration sensor according to the present invention is shown in FIG. 1. The input light beam 2 (here shown as being collimated) passes through beam splitters 4, 6, 8 which reflect a portion of the light to the aberration modules 10, 12, 14. The beam splitters are of high optical quality so as not to introduce significant additional wavefront phase errors.

Each of the n aberration modules 10, 12 14 receives a replica of the input beam 26, 28, 30 and produces two analog output voltages 16, 18, 20. Finally, the replica beam 32 is fed into the power sensor module 22 which produces an output voltage Vo at 24. The computer 34 digitizes all voltages 16, 18, 20 and 24 and calculates the aberration amplitudes for the $i^{th}$ channel according to the equation:

$$A_i = \frac{V_i^+ - V_i^-}{V_o}. \tag{1}$$

As a result of the normalization to the light power signal Vo, the aberration coefficients are insensitive to fluctuations in the brightness of the scene used to produce the input collimated beam 2.

Figure 2:
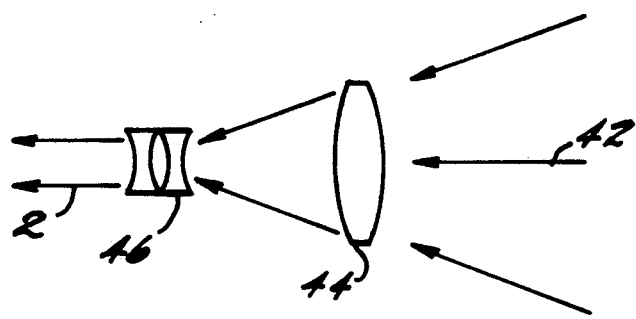
FIG. 2 shows an optical system for providing an optical beam to the aberration sensor of the present invention.

One method for producing the input beam by means of an external optical system is shown in FIG. 2. In FIG. 2, light 42 from arbitrary scene 40 is collected by lens 44, relayed to negative lens 46 which collimates the light beam 2 (which is the input light beam to the device shown in FIG. 1).

The computer 34 calculates the aberration coefficients and generates a display signal 36 which drives a video display unit 38 which indicates the current values by means of numbers or graphics. The wavefront phase error due to either a selected single aberration or the algebraic sum of the wavefront phase due to the superposition of all of the individual aberration amplitudes can be shown. Typical aberrations could be orthogonal sets such as Zernike polynomials, or the more familiar classical optical aberrations such as defocus, spherical aberration, coma, astigmatism, which are not orthogonal.

The wavefront phase is naturally decomposed into separate components due to the parallel optical and digital computing method employed in the wavefront aberration sensor of the present invention. If an orthogonal aberration set is chosen, the individual aberration coefficients may be algebraically summed as indicated in Equation 2:

$$W = \sum_{i=1}^{n} A_i M_i, \qquad (2)$$

where A are the scalar aberration amplitudes as determined using equation 1, $M_i$ is a matrix whose elements represent the scaled phase variations for the $i^{th}$ aberration over the area of the input light beam and W is the total net wavefront phase matrix with the same rank and order as the matrices $M_i$.

In a closed-loop adaptive optics wavefront control system the number of matrix elements in M (and W) could be selected to match the number of piston actuators in a deformable mirror for instance. In this case W represents the reconstructed wavefront, the phase conjugate of which would be commanded to the deformable mirror actuators in order to compensate, i.e. make zero the wavefront phase error in the optical beam after it is reflected from the deformable mirror.

Figure 3:
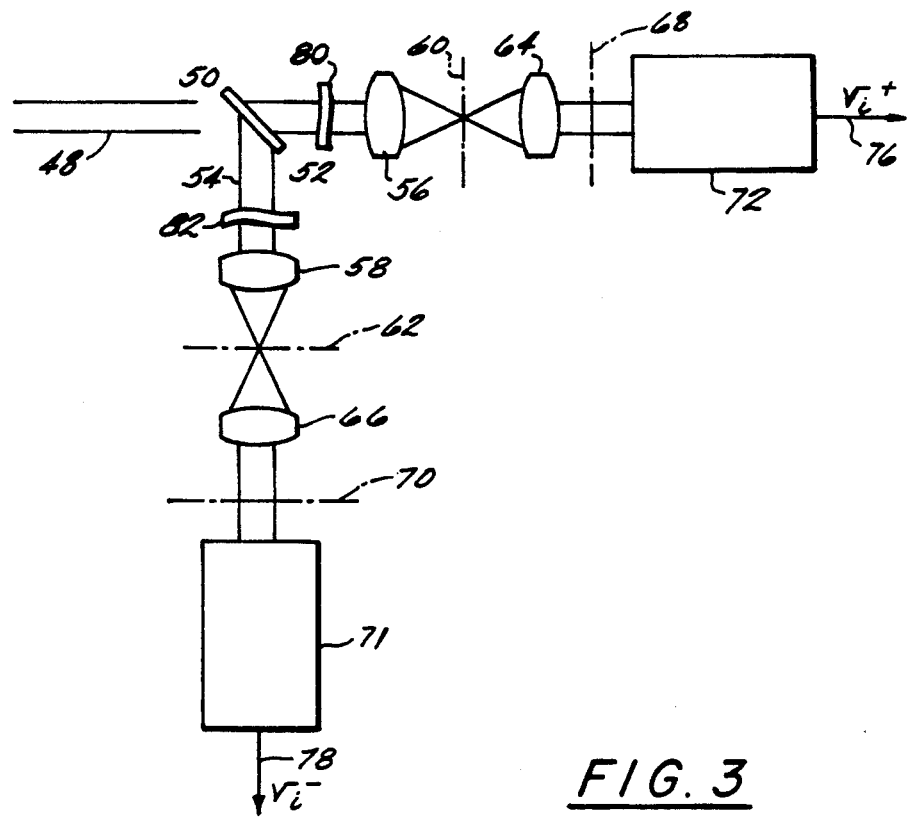
FIG. 3 shows a first embodiment of an aberration sensor module of the present invention.

One aberration module is shown in FIG. 3. These modules as shown will function with a coherent, narrow band input beam such as a laser. Additional modifications are required if the input beam is broad-band visible light. In this case additional hardware such as a charge coupled device (CCD) camera, a liquid crystal array device, and a laser are needed to convert the spatial frequency information on the broad-band input beam into the same information on an internal coherent light beam. As shown in FIG. 3, a coherent input beam 48 is split into two replica beams by means of beam splitter 50. The two output beams 52 and 54 then pass through two transmissive aberrator plates 80 and 82. These aberrator plates are configured so they introduce a known amount of the desired aberration into the beams with equal amplitudes but with opposite signs. Thus, they will in general add to and subtract from the same type of aberration present on the input beam. The magnitude of the aberration will depend on the expected values typical of the application, but will generally be approximately equal to or larger than the input aberration to be measured. Thus, aberrator plates 80 and 82 add to and subtract from the input beam aberration. From this point forward the elements of the two channels in the module are identical. Lenses 56 and 58 form the images of the input scene at planes 60 and 62. Next, lenses 64 and 66 form the Fourier Transform of the aberrated images and place them on the masks 68 and 70. These masks are annular apertures which effectively act as spatial filters for the Fourier Transform of the image. The amount of light that passes through the mask is the integral, from spatial frequency 1 to spatial frequency 2, of the power in the image that was between spatial frequency 1 and spatial frequency 2. Depending upon the aberration chosen via aberrator plates 80 and 82, different spatial frequencies will be chosen by selecting different mask geometries (still annular, but with different inner and outer diameters) by either having fixed but different masks for different aberrations or by making the masks programmable with either shutters or a liquid crystal spatial light modulator.

The integral of the power over selected spatial frequencies provides the output voltages $V_{I+}$ and $V_{I-}$. Any aberrations in the beam will remove power from the high amount of light measured. The particular spatial frequencies chosen will be dependent on the aberration being measured.

Figure 4:
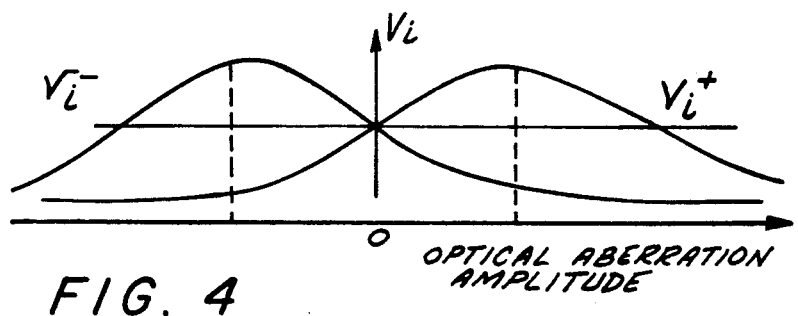
FIG. 4 shows a plot of aberration sensor output voltage difference vs input aberration amplitude.
Figure 5:
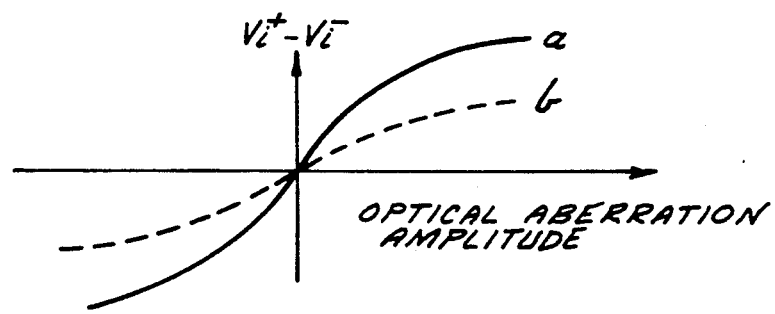
FIG. 5 shows a plot of sensor output voltage vs input aberration amplitude.

FIG. 4 shows the output voltages as functions of the input beam aberration. FIG. 4 shows that $V_i^+$ is a maximum when the input beam aberration is positive and of magnitude $C_i$. In this case the aberrator plate 80 exactly cancels the input beam aberration. When the input beam aberration is $-C_i$ then $V_i^-$ peaks at its maximum value. FIG. 5 shows $V_i^- - V_i^-$ as a function of the input aberration amplitude.

Curve "a" in FIG. 5 represents the module response when no other aberrations of other types are present. Curve "b" in FIG. 5 represents module i response when significant aberrations of other types are present. In this case the voltage difference is reduced but the null balance point at the origin is maintained. Compensation for this effect could be carried out in computer 34 and is due to cross talk reductions in the sharpness function amplitude. Thus the gain or scale factor of each module is affected by the magnitude of the orthogonal aberrations, but the null point is not. The result of this effect is a reduction in accuracy of measuring wavefront phase errors which are significantly different than zero. However, if this invention were used in a closed loop adaptive optics system, the steady-state errors will be reduced to zero since the null points are stable and independent for each module. A slight degradation in transient performance, and a corresponding slight reduction in closed-loop bandwidth, will result from the reduced system loop gain when several significant aberrations of different types are present simultaneously. This may be entirely acceptable in many applications, particularly when traded off against the fact that the sensor functions for an arbitrary input scene. It should be noted that if there are no inherently high spatial frequencies in the scene, adaptive optics are not needed to improve the image, i.e. no improvement is possible. It should be further noted that only those wavefront phase errors which are highly correlated over the entire field of view of the sensor will be measured, i.e. the sensor has an "isoplanatic patch" which corresponds to the entire field of view. Atmospheric turbulence near the objective lens 44 as well as aberrations introduced by the telescope optics 44-46 will be sensed. The aberration sensor of the present invention is insensitive to atmospheric turbulence near the target scene 40 which has a correlation length much smaller than the size of the scene.

To assure accurate centering and absolute nulling as shown in FIG. 5, it is necessary for the modules to apply only an orthogonal set of aberration functions.

With sufficient scene brightness e.g. if the scene were actively illuminated using a laser, the sensor readout rate can be extremely rapid since high speed electronics and detectors can be operated at frequencies of many tens of megahertz.

The power sensor 22 in FIG. 1 can be one-half, i.e. all parts to the right of beam-splitter 50, of the module shown in FIG. 3 with some elements i.e., elements 82, 58, 66, and 70 removed.

Figure 6:
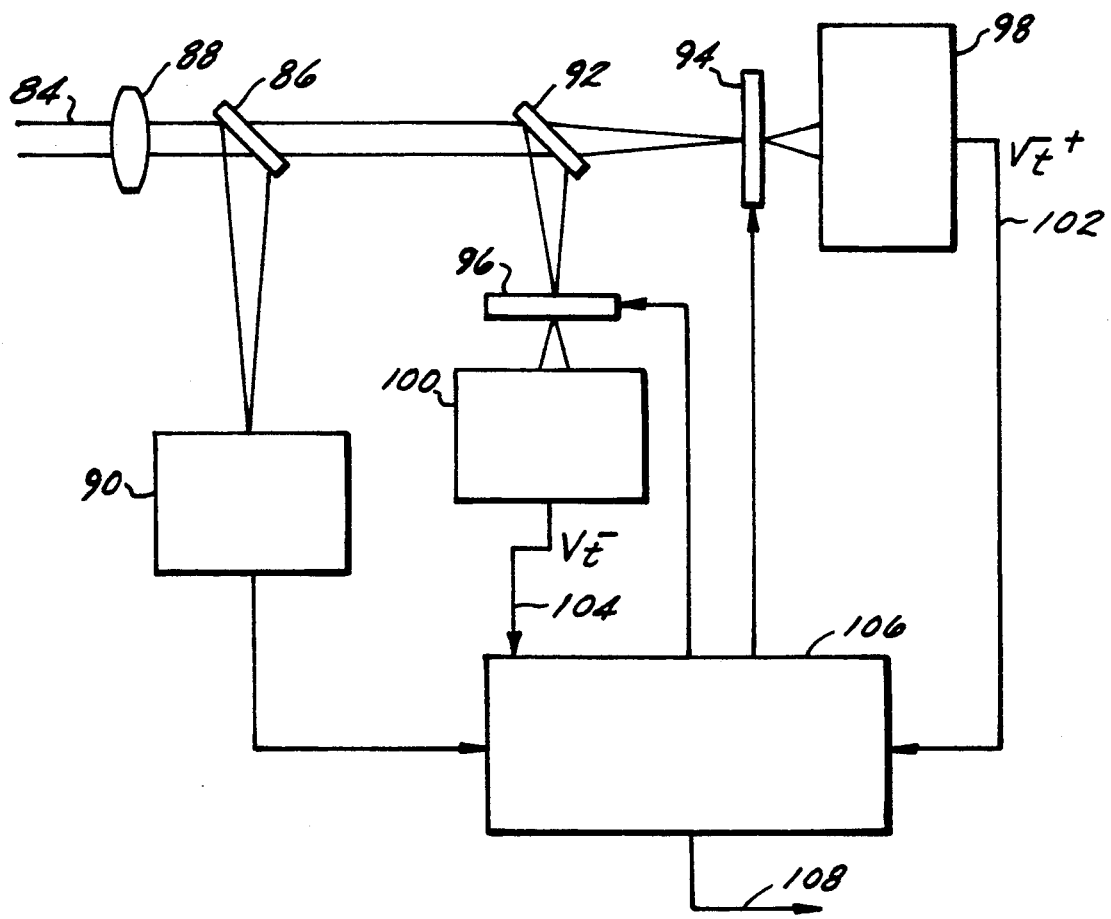
FIG. 6 shows a second embodiment of the aberration sensor module of the the present invention.

Global tip and tilt of the wavefront can also be sensed using a modified module similar to that shown in FIG. 3. This would be useful as a tracking error sensor for stabilizing the scene image on an external camera (not shown). The tip and tilt modules could be physically identical but mounted 90° apart in orientation with respect to the input beam. A one-axis tracker which works for an arbitrary input scene is shown in FIG. 6.

The replica input beam 84 is subdivided by beam splitter 86 after being focussed by lens 88 onto charge coupled device (CCD) camera 90. This image is transmitted to tracking computer 106. The remaining focussed light is further subdivided by beam splitter 92 and passes through two identical transmissive liquid crystal devices (LCD) which are addressable arrays located at or very near the image planes. The light transmitted through the LCD's is then detected by photodetectors 98 and 100. The tracking error is determined by the Tracking Computer 106 by first digitizing a single image from the CCD camera 90 when a new target image has been acquired. The Tracking Computer 106 next calculates the two-dimensional autocorrelation function, and in particular determines the full width at the half maximum of the central peak of the image irradiance autocorrelation function. Next the Tracking Computer 106 determines and applied appropriate drive signals to the addressable array LCD devices. The optical transmission is modulated in proportion to the measured irradiance of the first CCD image. That is, bright image areas are made transmissible and black image areas are made opaque. In LCD's 94 and 96 the transmissive image replicas are also displaced along the desired tracking axis by one half the full width at half maximum of the image irradiance autocorrelation function. It will be seen that the photodetected output signals $V_t^+$ at 102 and $V_t^-$ at 104 will depend on the displacement between the current image location and location of the fixed LCD image. When the current image is located exactly halfway between the locations of the LCD images, the photodetector outputs $V_t^+$ and $V_t^-$ will be equal and the tracking error is zero.

Displacement of the current image toward that on LCD 94 will result in $V_t^+$ increasing and $V_t^-$ moving toward zero. Similarly, displacement of the current image toward that on LCD 96 will result in a more negative $V_t^-$ and decreasing $V_t^+$. Thus, to first order, we can find the tracking error using the equation:

$$E = C_t(V_t^+ - V_t^-), \quad (3)$$

where CT is estimated using an algorithm in the Tracking Computer which depends on the width of measured autocorrelation function and also on the tracking error in the orthogonal axis (due to cross talk between axes). Alternatively, the wavefront that can be estimated by:

$$E = C_t \frac{(V_t^+ - V_t^-)}{(V_t^+ + V_t^-)}, \quad (4).$$

which effectively normalized the voltage difference by the voltage sum, This estimate will be relatively insensitive to tracking errors on the orthogonal axis.

Figure 7:
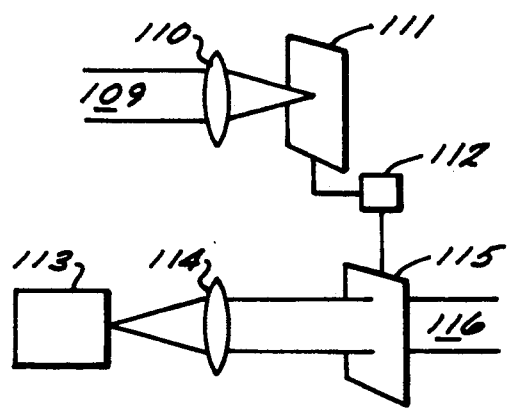
FIG. 7 shows an apparatus for converting an input beam formed from broad spectral bandwidth light to a narrow band input beam.

To operate either the wavefront aberration sensor or the tracking module described above with incoherent illumination e.g. broad-band spectral illumination, or possibly white light a conversion of broad band to narrow band must take place. An apparatus for converting from broad band illumination is shown in FIG. 7. The source 109 passes through an imaging system 110 and is focussed onto an imaging array (e.g. a CCD or CID array). The image information is transferred via data path 112 to liquid crystal display (LCD) 115. A laser 113 which is collimated by lens 114 is propagated through LCD 115, and the narrow spectral band width beam 116 containing the image information can now be propagated through the rest of the system, e.g. as input 2 in FIG. 1 or input 48 in FIG. 3. The replica image created on the liquid crystal display 115 identically corresponds to the incoherent image in that it is more transmissive where the incoherent image is bright and less transmissive where the incoherent image is dark. Ideally, the device would provide a transmission of one for the brightest part of the incoherent image and a transmission of zero for the darkest part of the incoherent image. The distance from element 115 to the imaging lens 56 or 58 should be within the near field of the diffraction due to the LCD pixel dimensions and the laser wavelength.

Figure 8:
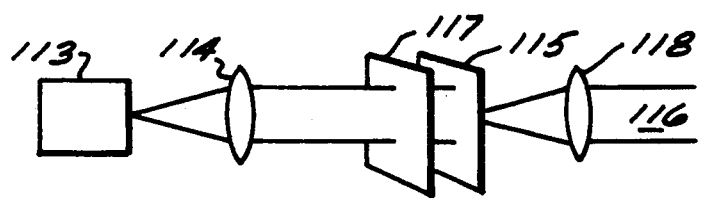
FIG. 8 shows an alternative embodiment for the apparatus of FIG. 7.

If the near-field distance constraint cannot be maintained between 115 and 56 or 58 additional optical elements must be inserted into the beam as shown in FIG. 8. A scattering screen 117 is placed immediately before the LCD 115 and an additional relay lens 118 is used to image the LCD 115 at infinity. The beam 116 can now be used as the input beam 2 or 48 for distances which are not in the near-field of the LCD 115 pixels. To eliminate speckle effect of the screen 117, a rotating scattering element can be used to average out the speckle noise.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. An apparatus for sensing phase aberration in an optical beam wherein said optical beam is a coherent optical beam having a narrow spectral bandwidth, comprising:

splitter means for splitting the optical beam into identical first and second replica beams;

photodetector means for sensing total light power of the first replica beam, said photodetector means providing a photodetector output signal indicative of the total light power of the first replica beam;

aberration sensor means for detecting a selected phase aberration of the second replica beam, said aberration sensor means providing first and second aberration sensor output signals;

computer means for calculating an aberration coefficient indicative of the signed aberration amplitude of the selected phase aberration, if said selected phase aberration is present in the optical beam, from the difference between the first and second aberration sensor output signals normalized by the photodetector output signal;

said aberration coefficient being insensitive to fluctuations in brightness of the optical beam; and wherein said aberration sensor means comprises;

second splitter means for splitting the second replica beam into identical third and fourth replica beams;

first transmissive aberrator means for introducing a first known amount of the selected phase aberration into the third replica beam, said first known amount having a first aberration amplitude and a first aberration direction;

second transmissive aberrator means for introducing a second known amount of the selected phase aberration into the fourth replica beam, said second known amount having a second aberration amplitude and a second aberration direction, wherein the first and second aberration amplitudes are equal and wherein the second aberration direction is opposite the first aberration direction;

first optical means for focusing the aberrated third replica beam;

second optical means for focusing the aberrated fourth replica beam;

third optical means for obtaining a spatial power spectrum of the focused aberrated third replica beam;

fourth optical means for obtaining a spatial power spectrum of the focused aberrated fourth replica beam;

first mask means for directing said aberrated third replica beam through an first annular aperture;

second mask means for directing said aberrated fourth replica beam through a second annular aperture;

first photodetector means for detecting light power transmitted by the first mask means, said first photodetector means providing the first aberration sensor output signal; and second photodetector means for detecting light power transmitted by the second mask means said second photodetector means providing said second aberration sensor output signal.

2. The apparatus of claim 1, wherein the selected aberration comprises tilt, defocus, spherical aberration, coma, astigmatism, or a Zernike polynomial.

3. An apparatus for sensing phase aberration in an optical beam, comprising:

first splitter means for splitting the optical beam into identical first and second replica beams;

photodetector means for sensing total light power of the first replica beam, said photodetector means providing a photodetector output signal indicative of the total light power of the first replica beam;

aberration sensor means for detecting a selected phase aberration of the second replica beam, said aberration sensor means providing first and second aberration sensor output signals;

computer means for calculating an aberration coefficient indicative of the signed aberration amplitude of the selected phase aberration, fi said selected phase aberration is present in the optical beam, from the difference between the first and second aberration sensor output signals normalized by the photodetector output signal;

said aberration coefficient being insensitive to fluctuations in brightness of the optical beam; and wherein said aberration sensor comprises;

optical means for focusing said second replica beam;

second splitter means for splitting the focused second replica beam into identical focuses third and fourth replica beams;

camera means for monitoring said focused third replica beam, said camera means providing a camera image output signal;

computer means, responsive to said camera output signal, for calculating an image irradiance autocorrelation function for the third replica beam, said computer means providing an output signal indicative of the width of said irradiance autocorrelation function;

third splitter means for splitting the focused fourth replica beam into identical focused fifth and sixth replica beams;

first addressable transmissive liquid crystal means, disposed at the image plane of the focused fifth replica beam and responsive to the output signal of said computer means, for modulating optical transmission of the fifth replica beam;

second addressable transmissive liquid crystal means, disposed at the image plane of the focused sixth replica beam and responsive to the output signal of said computer means, for modulating optical transmission of the sixth replica beam;

first photodetector means for detecting total light power transmitted by the first liquid crystal means, said first photodetector means providing said first aberration sensor output signal to said computer means; and second photodetector means for detecting total light power of the second liquid crystal means, said second photodetector means providing said second aberration sensor output signal to said computer means.

4. An apparatus for sensing phase aberration in an optical beam wherein said optical beam is a coherent optical beam having a narrow spectral bandwidth, comprising:

first splitter means for splitting the optical beam into a plurality of identical first and second replica beams;

photodetector means for sensing total light power of said first replica beam, said photodetector means providing a photodetector output signal indicative of total light power of said first replica beam;

aberration sensor means, comprising a plurality of aberration sensors, for detecting selected phase aberrations of said first and second replica beams, each of said aberration sensors providing a pair of aberration sensor output signals indicative of a detected aberration of one of said first and second replica beams;

computer means for calculating an aberration coefficient for each pair of aberration sensor output signals, each coefficient being normalized by the photodetector output signal, and being indicative of a signed amplitude of one of the selected phase aberrations for calculating the algebraic sum of the aberration coefficients to provide a total net wavefront phase matrix; and wherein said aberration sensor means comprises;

second splitter means for splitting the second replica beam into identical third and fourth replica beams;

first transmissive aberrator means for introducing a first known amount of the selected phase aberration into the third replica beam, said first known amount having a first aberration amplitude and a first aberration direction;

second transmissive aberrator means for introducing a second known amount of the selected phase aberration into the fourth replica beam, said second known amount having a second aberration amplitude and a second aberration direction, wherein the first and second aberration amplitudes are equal and wherein the second aberration direction is opposite the first aberration direction;

first optical means for focusing the aberrated third replica beam;

second optical means for focusing the aberrated fourth replica beam;

third optical means for obtaining a spatial power spectrum of the focused aberrated third replica beam;

fourth optical means for obtaining a spatial power spectrum of the focused aberrated fourth replica beam;

first mask means for directing said aberrated third replica beam through a first annular aperture;

second mask means for directing said aberrated fourth replica beam through a second annular aperture;

first photodetector means for detecting light power transmitted by the first mask means, said first photodetector means providing the first aberration sensor output signal to said computer means; and second photodetector means for detecting light power transmitted by the second mask means, said second photodetector means providing said second aberration sensor output signal to said computer means.

5. The apparatus of claim 4, further comprising:

adaptive optics control means, responsive to said signal processing means, for compensating wave front phase error in said optical beam.

6. An apparatus for sensing phase aberration in an optical beam, comprising:

first splitter means for splitting the optical beam into a plurality of identical first and second replica beams;

photodetector means for sensing total light power of said first replica beam, said photodetector means providing a photodetector output signal indicative of total light power of said first replica beam;

aberration sensor means, comprising a plurality of aberration sensors, for detecting selected phase aberrations of said first and second replica beams, each of said aberration sensors providing a pair of aberration sensor output signals indicative of a detected aberration of one of said first and second replica beams;

computer means for calculating an aberration coefficient for each pair of aberration sensor output signals, each coefficient being normalized by the photodetector output signal, and being indicative of a signed amplitude of one of the selected phase aberrations for calculating the algebraic sum of the aberration coefficients to provide a total net wavefront phase matrix; and wherein said aberration sensor comprises;

optical means for focusing said second replica beam;

second splitter means for splitting the focused second replica beam into identical focused third and fourth replica beams;

camera means for monitoring said focused third replica beam, said camera means providing a camera image output signal;

computer means, responsive to said camera output signal, for calculating an image irradiance autocorrelation function for the third replica beam, said computer means providing an output signal indicative of the width of said irradiance autocorrelation function;

third splitter means for splitting the focused fourth replica beam into identical focused fifth and sixth replica beams;

first addressable transmissive liquid crystal means, disposed at the image plane of the focused fifth replica beam and responsive to the output signal of said computer means, for modulating optical transmission of the fifth replica beam;

second addressable transmissive liquid crystal means, disposed at the image plane of the focused sixth replica beam and responsive to the output signal of said computer means, for modulating optical transmission of the sixth replica beam;

first photodetector means for detecting total light power transmitted by the first liquid crystal means, said first photodetector means providing said first aberration sensor output signal to said computer means; and second photodetector means for detecting total light power of the second liquid crystal means, said second photodetector means providing said second aberration sensor output signal to said computer means.

7. An apparatus for detecting phase aberration of a coherent optical beam having a narrow spectral bandwidth, comprising:

splitter means for splitting the beam into identical first and second replica beams;

first transmissive aberrator means for introducing a first known amount of the selected phase aberration into the first replica beam, said first known amount having a first aberration amplitude and a first aberration direction;

second transmissive aberrator means for introducing a second known amount of the selected phase aberration into the second replica beam, said second known amount having a second aberration amplitude and a second aberration direction, wherein the first and second aberration amplitudes are equal and wherein the second aberration direction is opposite the first aberration direction;

first optical means for focusing the aberrated first replica beam;

second optical means for focusing the aberrated second replica beam;

third optical means for obtaining a spatial power spectrum of the focused aberrated first replica beam;

fourth optical means for obtaining a spatial power spectrum of the focused aberrated second replica beam;

first mask means for directing said aberrated first replica beam through an first annular aperture;

second mask means for directing said aberrated second replica beam through a second annular aperture;

first photodetector means for detecting light power transmitted by the first mask means, said first photodetector means providing a first output signal; and second photodetector means for detecting light power transmitted by the second mask means, said second photodetector means providing a second output signal.

8. An apparatus for detecting phase aberration of an optical beam, comprising:

optical means for focusing a replica beam;

first splitter means for splitting the focused replica beam into identical focused first and second replica beams;

camera means for monitoring said focused first replica beam said camera means providing a camera image output signal;

computer means, responsive to said camera output signal, for calculating an image irradiance autocorrelation function for the first replica beam, said computer means providing an output signal indicative of the width of said irradiance autocorrelation function;

second splitter means for splitting the focused second replica beam into identical focused third and fourth replica beams;

first addressable transmissive liquid crystal means, disposed at the image plane of the focused third replica beam and responsive to the output signal of said computer means, for modulating optical transmission of the third replica beam;

second addressable transmissive liquid crystal means, disposed at the image plane of the focused fourth replica beam and responsive to the output signal of said tracking means, for modulating optical transmission of the fourth replica beam;

first photodetector means for detecting total light power transmitted by the first liquid crystal means, said first photodetector means providing a first output signal; and second photodetector means for detecting total light power of the second liquid crystal means, said second photodetector means providing a second output signal.

9. A process for sensing phase aberration in an optical beam wherein said optical beam is a coherent optical beam having a narrow bandwidth comprising:

splitting the optical beam into identical first and second replica beams;

detecting a selected phase aberration of the first replica beam;

providing first and second aberration sensor output signals indicative of the selected phase aberration;

sensing total light power of the second replica beam;

providing a photodetector output signal indicative of the total light power of the second replica beam;

calculating an aberration coefficient indicative of the signed aberration amplitude of the selected phase aberration, if said selected phase aberration is present on the optical beam, from the difference between the first and second aberration sensor output signals normalized by the photodetector output signal;

said aberration coefficient being insensitive to fluctuations in brightness of the optical beam; and splitting the first replica beam into identical third and fourth replica beams;

introducing a first known amount of the selected phase aberration into the third replica beam, said first known amount having a first aberration amplitude and a first aberration direction;

introducing a second known amount of the selected phase aberration into the fourth replica beam, said second known amount having a second aberration amplitude and a second aberration direction, wherein the first and second aberration amplitudes are equal and wherein the second aberration direction is opposite the first aberration direction;

focusing the aberrated third replica beam to produce a first image;

focusing the aberrated fourth replica beam to produce a second image;

generating a fifth beam using a first lens to obtain the Fourier Transform of the first image;

generating a sixth beam using a second lens to obtain the Fourier Transform of the second image;

directing said fifth beam through a first annular aperture;

directing said sixth beam through a second annular aperture;

directing first light power transmitted by the first annular aperture, said first detected light power means providing the first aberration sensor output signal; and detecting second light power transmitted by the second annular aperture said second detected light power providing said second aberration sensor output signal.

10. A process for sensing phase aberration in an optical beam, comprising:

splitting the optical beam into identical first and second replica beams;

detecting a selected phase aberration of the first replica beam;

providing first and second aberration sensor output signals indicative of the selected phase aberration;

sensing total light power of the second replica beam, providing a photodetector output signal indicative of the total light power of the second replica beam;

calculating an aberration coefficient indicative of the signed aberration amplitude of the selected phase aberration, if said selected phase aberration is present on the optical beam, from the difference between the first and second aberration sensor output signals normalized by the photodetector output signal;

said aberration coefficient being insensitive to fluctuations in brightness of the optical beam; and wherein detecting said selected phase aberration sensor comprises;

focusing said second replica beam;

splitting the focused second replica beam into identical focused third and fourth replica beams;

imaging said focused third replica beam;

calculating an image irradiance autocorrelation function for the third replica beam;

providing a computer output signal indicative of the width of the irradiance autocorrelation function;

splitting the focused fourth replica beam into identical focused fifth and sixth replica beam;

modulating optical transmission of the fifth replica beam in response to said image of the focused third replica beam and the width of the image autocorrelation function;

modulating optical transmission of the sixth replica beam in response to said image of the focused third replica beam and the width of the image autocorrelation function;

detecting total light power of the image of the focused third replica beam;

providing a first aberration sensor output signal, said first signal being indicative of the detected total light power of the modulated fifth replica beam;

detecting total light power of the modulated sixth replica beam; and providing said second aberration sensor output signal, said second signal being indicative of the detected total light power of the modulated sixth replica beam.

11. An apparatus for converting an image of a source formed from incoherent radiation to coherent radiation, comprising:
   imaging means for providing an incoherent image of the source, said incoherent image being formed from incoherent radiation;
   detector means for detecting the incoherent image of the source,
   data transfer means for transforming the incoherent image detected into control signals;
   coherent radiation means for providing a collimated beam of coherent radiation;
   liquid crystal display means, responsive to the control signals, for introducing a transmissive replica image of the source into the beam of coherent radiation.

12. The apparatus of claim 11, wherein the incoherent image exhibits gradation of brightness, the transmissive replica image exhibits gradation of transmissivity and the gradations of transmissivity corresponds to the gradation of brightness so that the transmissive replica image corresponds identically to the incoherent image.

13. A method for converting an image of a source formed from incoherent radiation to coherent radiation, comprising;
   providing an incoherent image of the source, said incoherent image being formed from incoherent radiation;
   detecting the incoherent image,
   transforming the incoherent image detected into control signals;
   providing a collimated beam of coherent radiation;
   introducing a transmissive replica image of the source into the beam of coherent radiation, said transmissive replica image being formed by addressable liquid crystal display means in response to said control signals.

14. The apparatus of claim 13, wherein the incoherent image exhibits gradation of brightness, the transmissive replica image exhibits gradation of transmissivity and the gradations of transmissivity corresponds to the gradation of brightness so that the transmissive replica image corresponds identically to the incoherent image.

* * * * *